INVENTOR.
FREDERICK A. WILHELM JR.
BY Allan Ratner
ATTORNEY

INVENTOR.
FREDERICK A. WILHELM JR.
BY Allan Ratner
ATTORNEY

INVENTOR.
FREDERICK A. WILHELM JR
BY Allen Ratner
ATTORNEY

CARRY-BORROW SYSTEM

Filed May 23, 1966

INVENTOR.
FREDERICK A. WILHELM JR

BY

Allan Ratner

ATTORNEY

United States Patent Office 3,437,801
Patented Apr. 8, 1969

3,437,801

CARRY-BORROW SYSTEM

Frederick A. Wilhelm, Jr., Eatontown, N.J., assignor to Electronic Associates Inc., Long Branch, N.J., a corporation of New Jersey Filed May 23, 1966, Ser. No. 552,033
Int. Cl. G06f 7/385, 7/42, 7/50
U.S. Cl. 235—175 21 Claims

ABSTRACT OF THE DISCLOSURE

The specification describes an improved carry-borrow system utilizing a plurality of NOR circuits wherein the inversion logic required by the prior art is eliminated by the use of both the true and complementary carry-borrow equations.

Figure 1:
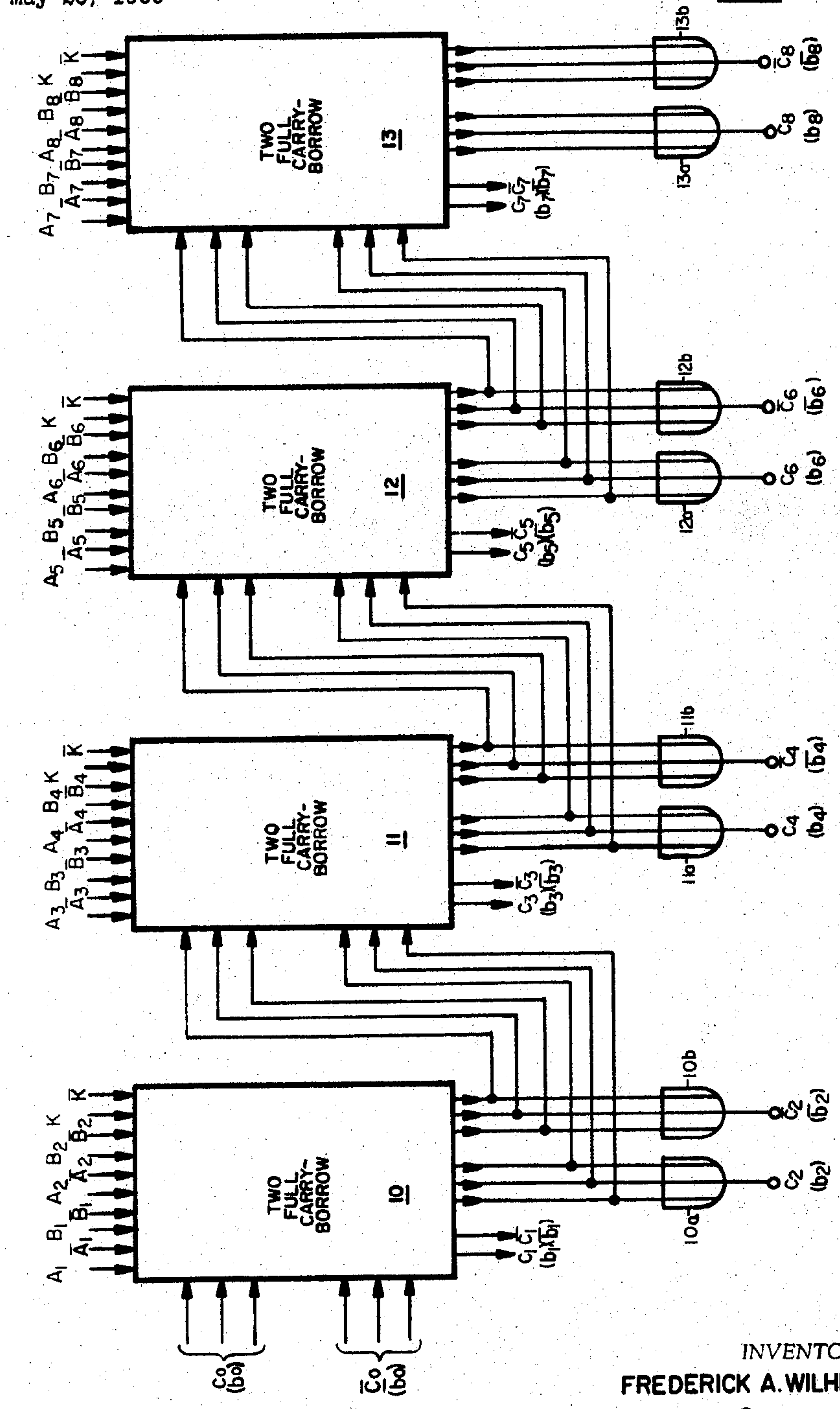

This invention relates to a carry-borrow system for an adder-subtracter and more particularly to decreasing the time for producing carrys during addition and borrows during subtraction of binary words in a parallel digital computer.

In parallel digital computers, addition and subtraction are executed in parallel. That is, a separate line is utilized for each bit of a word number and all bits are transmitted simultaneously in parallel. In this manner, separate adder-subtracters are used for addition and subtraction in each order of the numbers involved. Specifically, a group of full adder-subtracters are connected together in number equal to the number of bits of a word used in the digital computer. Additionally, it has been known to utilize a carry-borrow system separate from the full adder-subtracters.

By way of example, in the simplest carry-borrow systems, after the first order or least significant operands have been added, a carry is produced by a first order carry-borrow circuit. In turn, the second full adder-subtracter produces a second order addition and a second order carry is then produced by a second order carry-borrow circuit.

In this manner, a serial carry is formed in which the carry ripples through each of the carry-borrow circuits in turn. In such serial systems the total carry time is of substantially long duration since a carry is produced only after each order addition has occurred. Only then can addition take place in the next higher order. The carry or borrow must ripple through each of the orders in turn to produce a long carry-borrow time duration.

In order to decrease carry-borrow time, parallel carry-borrow systems have been devised in which all of the carrys or borrows of each of the orders are produced simultaneously. However, in such parallel carry-borrow systems, a relatively large amount of hardware is required and adds significantly to the cost of the system.

As a compromise between the speed of the serial system and the cost and complexity of the parallel system, a combination of the serial-parallel carry-borrow system has been utilized. A group of orders of carry-borrows are arranged in subsets and within the subsets the carry-borrows are produced in parallel, with the carry-borrows only rippling between the carry-borrow subsets. In this manner, the total carry-borrow time is decreased as compared with a serial carry-borrow. It will be understood that this carry-borrow time is longer than that of the straight parallel carry-borrow system, but the serial-parallel system is substantially less expensive than straight parallel.

Many prior serial-parallel systems, however, left much to be desired as they required complex circuitry in producing a carry-borrow. In addition, the ripple between subsets was required to flow through a level of logic. Specifically, prior series-parallel systems required a level of logic between carry-borrow subsets which substantially increased the total time of addition and subtraction.

Accordingly, an object of the present invention is a serial-parallel carry-borrow system having significant increase in speed over prior serial-parallel system with a relatively small amount of hardware.

Another object of the present invention is the elimination of a level of logic between carry-borrow subsets in a serial-parallel system.

In accordance with the present invention, there is provided a serial-parallel carry-borrow system having a plurality of series connected carry-borrow subsets each of which has at least two orders. Each order of the subset has a true logic network and a complementary logic network with the true and the complementary operands of each order being applied to the true and complementary logic networks of the corresponding order. Each true logic network includes a first true gate which is responsive to add-subtract instruction signals for producing during addition, a true carry-borrow signal output when both true operands are in a 1-state and for producing during subtraction, a true carry-borrow signal output when the true minuend operand is in a 0-state and the true subtrahend operand is in a 1-state. Each complementary logic network includes a first complementary gate responsive to add-subtract instruction signals and is the complementary logic equivalent of the first true gate.

Each true logic network also includes a second true gate having its input connected to (1) the first complementary gate of the corresponding order, and of all preceding orders in the subset and (2) the complementary carry-borrow output of the complementary logic network of the most significant order of the preceding subset in the series, to produce a true carry-borrow signal output for the corresponding order when none of the inputs have a complementary carry-borrow signal applied thereto. Each of the complementary logic networks also include a second complementary gate which is the complementary logic equivalent of the second true gate.

Each of the true logic networks except for the first order further includes a third true gate which is connected to the first complementary gate of the corresponding order and which is responsive to the operands of the preceding order for producing; during addition, a true carry-borrow signal output when the complementary carry-borrow signal is not applied and both true operands of the preceding order are in a 1-state, and during subtraction, a true carry-borrow signal output when a complementary carry-borrow signal is not applied and in the preceding order, the true minuend operand is in the 0-state and the true subtrahend operands is in a 1-state. Each of the complementary logic networks except for the first order further includes a third complementary gate which is the complementary logic equivalent of the third true gate. In this manner, there is provided a plurality of carry-borrow subsets connected in series to comprise a serial-parallel carry-borrow system. The subsets may be connected together without the requirement of a level of logic between subsets. Thus, a twofold increase in speed is provided over prior serial-parallel systems with a relatively small amount of hardware.

Figure 2:
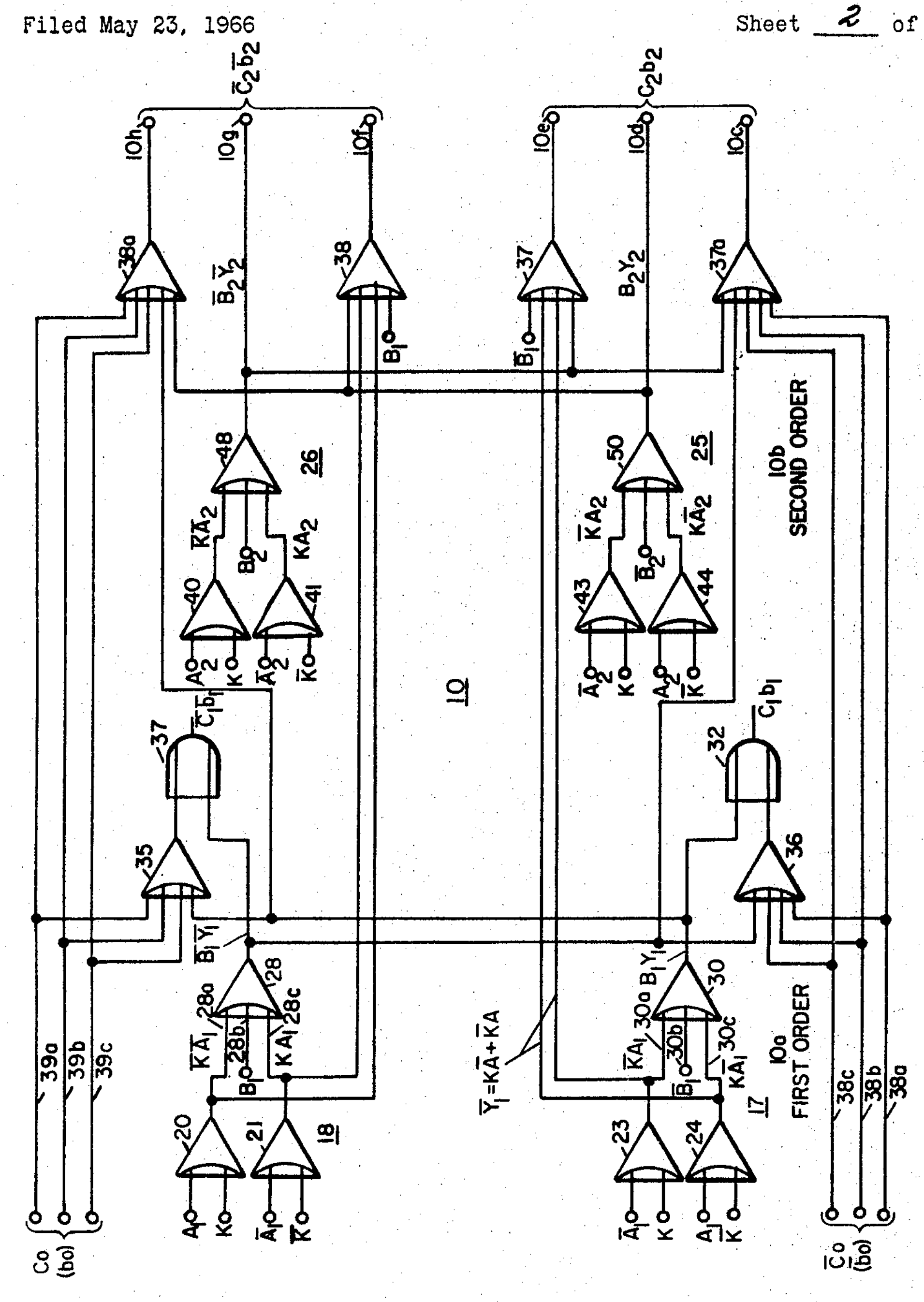
Figure 3A:
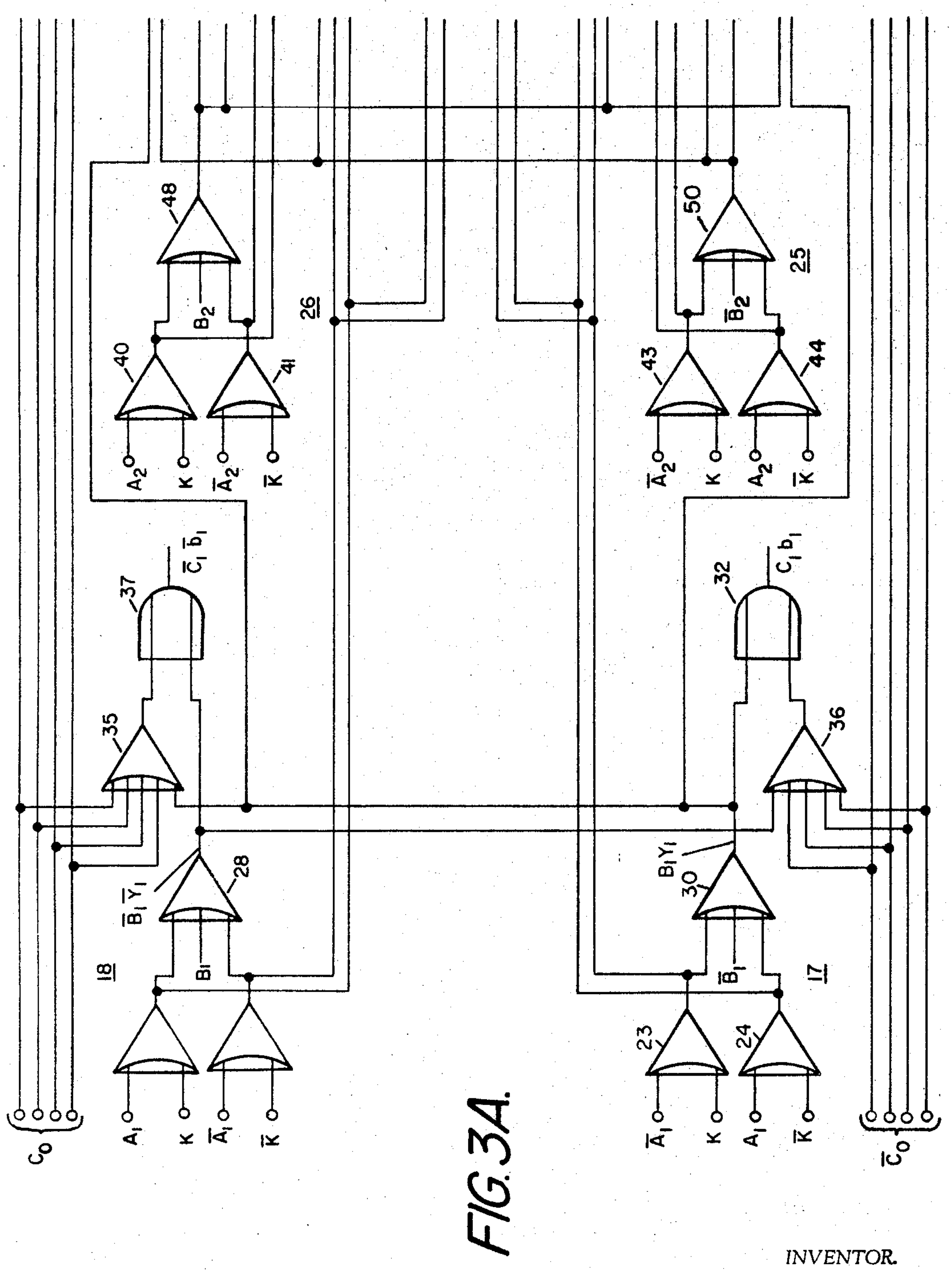
Figure 3B:
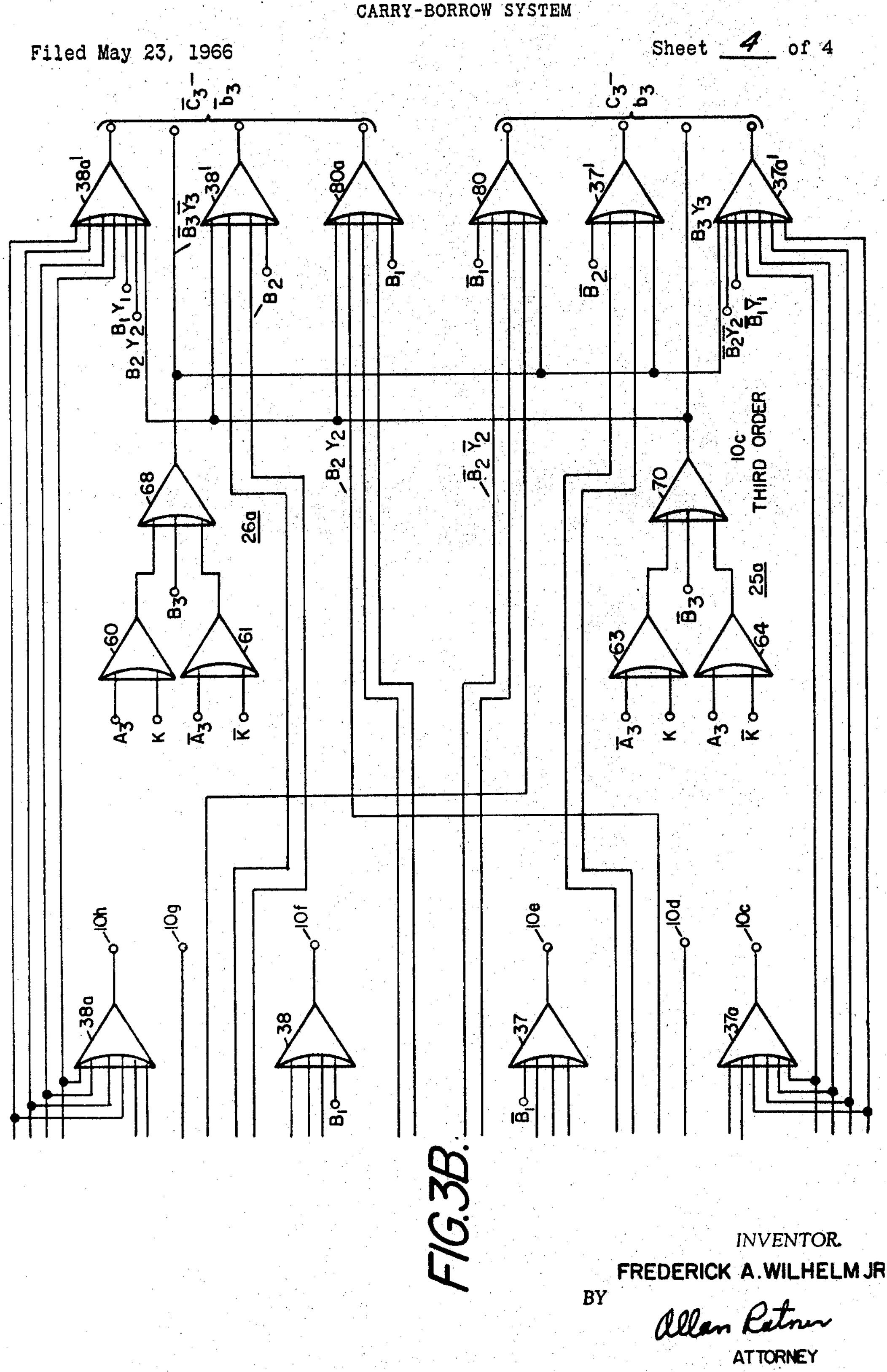

For a more detailed understanding of the invention, reference is made in the following detailed description to the accompanying drawings in which:

FIG. 1 is a block diagram which illustrates an eight bit full carry-borrow system according to the invention;

FIG. 2 schematically illustrates one of the two order carry-borrow subsets shown in block diagram form in FIG. 1, and FIGS. 3A and 3B when taken together schematically illustrate a three order carry-borrow subset according to another embodiment of the invention.

Referring now to FIG. 1, there is shown an eight bit full carry-borrow system for an eight bit full adder-subtracter. The adder-subtracter and the carry-borrow system are utilized in a parallel digital computer having an eight bit word and as well known in the art, one eight bit word number may be added to or subtracted from another eight bit word number.

Specifically, an accumulator provides a first operand or augend $A_1$–$A_8$ and an operand register provides a second operand or addend $B_1$–$B_8$. If the add control line K is in a 1-state indicating an add instruction, then the first and second operands are added together. On the other hand, if the subtract control line $\overline{K}$ or K' is in a 1-state indicating a substract instruction then the operand or subtrahend $B_1$–$B_8$ is subtracted from the operand or minuend $A_1$–$A_8$. The result, viz, sum for addition, difference for subtraction is put back in the accumulator, all as well known in the art as described for example in R. K. Richards, Arithmetic Operations in Digital Computers, Van Nostrand & Co., 1955, Chaper 4.

In this description in binary terminology a 1-state corresponds to a logic high and a 0-state corresponds to a logic low. The complement notation bar (—), e.g., $\overline{A}$ will be used interchangeably with prime ('), e.g., A'.

For the eight bit word, there are provided four subset carry-borrow circuits 10–13 with each subset providing the carry-borrows for two orders. Specifically, two orders of operands are applied to each of the carry-borrow circuits 10–13 with each operand order being in the form of a double rail input from the accumulator and operand register. More particularly, $A_1$, $A_1'$, $B_1$, and $B_1'$ all corresponding to the two least significant bits in a word number are applied to carry circuit 10. It will be understood that input $A_1$ and its complement comprising a double rail input and input $B_1$ and its complement comprising a double rail input are also applied to a single full adder-subtracter (not shown) to obtain the addition-subtraction of these operands. Similarly, operands $A_2$, $A_2'$, $B_2$ and $B_2'$ comprising the next least two significant bits are applied to the carry circuit 10. These double rail inputs are also applied to a second order single full adder-subtracter to obtain the addition-subtraction of these two operands. The carry circuit 10 produces the least significant bit carry-borrow $C_1$–$b_1$ as well as the complement $C_1'$–$b_1'$ which are applied to the carry-borrow input of the second full adder-subtracter. Similarly, carry-borrow circuit 10 produces the next least significant carry-borrow $C_2$–$b_2$ and its complemnt $C_2'$–$b_2'$ which are applied to the carry-borrow input of a third order adder-subtracter.

In this manner, the least and next least significant operand bits are applied to the carry-borrow circuit 10 and the least and next least significant carry-borrows are produced by circuit 10.

It will be noted that in order to produce carry-borrow $C_2$–$b_2$ there is provided a three wire output from circuit 10 which is applied to an OR gate 10*a*. The output of OR gate 10*a* is $C_2$–$b_2$, the next least significant carry-borrow. Similarly, to produce carry-borrow $C_2'$–$b_2'$ there is provided a three wire output from circuit 10 which is applied to an OR gate 10*b*. The three wire output corresponding to $C_2$–$b_2$ is applied to the next higher subset carry-borrow circuit 11. Similarly, the three wire output corresponding to $C_2'$–$b_2$ is applied to the carry-borrow circuit 11. The carry-borrow inputs to circuit 10 are $C_0$–$b_0$ which are normally in a 0-state and $C_0'$–$b_0'$ which are normally held in a 1-state.

The operand inputs to the next higher subset carry circuit 11 are similar to the operand inputs in carry-borrow circuit 10 except that they are two orders higher. Specifically, operands $A_3$, $A_3'$, $B_3$, $B_3'$, $A_4$, $A_4'$, $B_4$, and $B_4'$ are applied as the operand inputs to carry-borrow circuit 11. Similarly, the carry-borrow outputs of circuit 11 are two orders higher than the carry circuit 10. In addition, the three wire output corresponding to carry-borrow $C_4$–$b_4$ and the three wire outputs corresponding to carry-borrow of $C_4'$–$b_4'$ are applied to the next higher subset carry-borrow circuit 12. This logical progression follows for the next higher subset carry-borrow 12 and 13 with the most significant and the next most significant operands of the eight bit word being applied to carry-borrow circuit 13.

In operation of the eight bit full carry-borrow system of FIG. 1 it may be assumed that there is something in the accumulator from a previous operation. The operand register holds the quantity to be added to or subtracted from the quantity in the accumulator. At the time of a clock pulse, both the binary information in the accumulator and in the operand register are fed into the carry-borrow system and also into the eight full adders-subtracters for the eight bit word. It will be understood that carry-borrows are produced by the least significant circuit 10 and directed into the second and third full adders and the three wire carry-borrows corresponding to $C_2$–$b_2$ and its complements are fed into the next least significant subset circuit 11. At that time, circuit 11 produces carry-borrows $C_3$–$b_3$ and $C_4$–$b_4$ and their complements which are directed into the fourth and fifth full adder-subtracters. In addition, the three wire carry-borrow corresponding to $C_4$–$b_4$ and its complement is then fed into the next most significant subset circuit 12. In similar manner, circuit 12 produces carry-borrows which are directed to the sixth and seventh full adder-subtracter and the three wire carry-borrows corresponding to $C_6$–$b_6$ and its complements are applied to the most significant subset carry-borrow circuit 13. Circuit 13 produces (1) a carry-borrow $C_7$–$b_7$ and its complement which is applied to the eighth full adder and (2) a three wire carry-borrow corresponding to $C_8$–$b_8$ and its complement. The three wire output corresponding to $C_8$–$b_8$ is applied to OR gate 13*a* which produces carry-borrow $C_8$–$b_8$ the carry-borrow output of the eight bit word number. Similarly, the other three wire output is applied to OR gate 13*b* which produces carry-borrow $C_8'$–$b_8'$ the carry-borrow complement output of the eight bit word number. It will now be understood that the carry-borrow must "ripple" between the first circuit 10 and the second carry circuit 11 and then between the second circuit 11 and third circuit 12 and then between circuit 12 and circuit 13 in order to produce all of the carry-borrows for the eight bit addition-subtraction. After all of the carrys have been produced, the output of the eight full adders are gated into the accumulator all as well known in the art.

In FIG. 1, it will be noted that operating commands K and K' are applied to each of the carry-borrow circuits 10–13. K is the add control line and when it is in a 1-state the circuits 10–13 produce carries. Similarly, K' is the subtract control line and when in a 1-state, circuits 10–13 produce borrows.

As well known in the art the general expression for an add carry is $$(1)\qquad C_a = AB + C_{a-1}(AB' + A'B)$$

where $C_a$ denotes a bit position, and $C_{a-1}$ denotes the next least significant bit position.

The general expression for a borrow or subtract carry is $$(2)\qquad B_s = A'B + C_{a-1}(A'B' + AB)$$

These expressions may be qualified by the commands K and K' as follows:

$$(3)\qquad C_a = KAB + KC_{a-1}(AB' + A'B)$$

$$(4)\qquad B_s = K'A'B + K'C_{a-1}(A'B' + AB)$$

By combining $C_a$ and $B_s$, the general carry-borrow expression for the *n*th bit ($C_n$) can be developed as follows:

$$(5)\qquad C_n = B(KA + K'A') + C_{n-1}[B(KA' + K'A) + B'(KA + K'A')]$$

By letting (6) $$Y=KA+K'A'$$

(7) $$Y'=KA'+K'A$$

then $C_n$ and $C_n'$ can be written as:

(8) $$C_n=BY+C_{n-1}(B+Y)$$

(9) $$C_n'=B'Y'+C_{n-1}(B'+Y')$$

$C_n$ and $C_n'$ express the carry-borrow for the first order of each subset 10–13 while the second order carry-borrow can be expressed as:

(10) $$C_{n+1}=B_{n+1}Y_{n+1}+B_nY_n(B_{n+1}+Y_{n+1})+C_{n-1}(B_{n+1}+Y_{n+1})(B_n+Y_n)$$

(11) $$C_{n+1}'=B_{n+1}'Y_{n+1}'+B_n'Y_n'(B_{n+1}'+Y_{n+1}')+C_{n-1}'(B_{n+1}'+Y_{n+1}')(B_n'+Y_n')$$

The first order carry-borrow set forth in Equations 8 and 9 and the second order carry-borrows set forth in Equations 10 and 11 are implemented in each of the subsets 10–13. It will be noted that in Equations 8–11 that the first term (the first term after the equal sign) is a BY term which may be considered as the generated carry-borrow while the remaining terms in Equations 8–11 correspond to a transfer carry-borrow. The production of the generated carry-borrow and the transfer carry-borrow will later be described in detail.

The circuity of each of the subsets 10–13 are identical and therefore only one of them, viz., carry-borrow subset 10, need be described in detail. Accordingly, FIG. 2 illustrates the detailed circuitry of carry-borrow subset 10 which mainly comprises a group of NOR gates. The gates in the left hand side **10*a* of subset 10 in FIG. 2 provide the first order carry-borrow while the gates in the right hand side 10*b* of subset 10 provide the second order carry-borrow. For subset 10**, the first order is the least significant bit while the second order is the next least significant bit. The gates in the first order may be separated into a lower group which provide the first order carry-borrow ($C_1$–$b_1$) with the complement thereof being produced by the upper group ($C_1'$–$b_1'$). Similarly, the second order may be separated into a lower group of gates which provide the second order carry-borrow ($C_2$–$b_2$) with the upper group providing the complements thereof ($C_2'$–$b_2'$).

In order to provide the first order carry-borrows set forth by Equations 8 to 9 where $n=1$, it will be seen that NOR gate group 17 generates a signal BY while NOR gate group 18 generates B'Y'. Both BY and B'Y' are the first terms respectively in the first order carry-borrow Equations 8 and 9. Similarly, the first terms of the second order carry-borrow Equations 10 and 11 are generated by NOR gate group 25 and 26 respectively. Since $n+1=2$ then NOR gate group 25 produces the second order term $B'_{n+1}Y'_{n+1}$ and NOR gate group 26 provides the complementary second order term $B_{n+1}Y_{n+1}$. The second and remaining term of Equation 8 is provided by NOR gate 36 while the second and remaining term of Equation 9 is provided by NOR gate 35.

Accordingly, the outputs of NOR gate group 17 and gate 36 are applied to OR gate 32 to produce in combination the carry-borrow $C_1$–$b_1$. Similarly, the outputs of NOR gate group 18 and gate 35 are applied to OR gate 37 to provide in combination the carry-borrow $C_1'$–$b_1'$ and corresponding to Equation 9. With regard to Equation 10 the second term thereof is provided by NOR gate 37 while the third term is provided by NOR gate **37*a*. Accordingly, the combination of NOR gate group 25, 37 and 37*a* are applied to OR gate 10*a*, FIG. 1, to produce the second order carry-borrow $C_2$–$b_2$. With regard to the complement thereof as set forth in Equation 11 the second term thereof is provided by NOR gate 38 while the third term is provided by NOR gate 38*a*. Accordingly, the combination of NOR gate group 26, 38 and 38*a* are applied to OR gate 10*b***, FIG. 1, to produce the second order complementary carry-borrow $C_2$–$b_2'$.

In order to explain the operation of subset 10 it will be assumed that add control K is high while subtract line K' is low so that circuit 10 is operative to produce carries and not borrows. It will also be assumed that the operands applied to circuit 10 are in the following state:

TABLE I

| | | | |
|---|---|---|---|
| $A_1$–1 | $A_1'$–0 | $A_2$–1 | $A_2'$–0 |
| $B_1$–1 | $B_1'$–0 | $B_2$–0 | $B_1'$–1 |

$A_1$ is applied to one input of NOR gate 20 and $A_1'$ is applied to one input of NOR gate 21 with NOR gates 20 and 21 being in group 18. Similarly, $A_1$ is applied to one input of NOR gate 24 and $A_1'$ is applied to one input of NOR gate 23 with NOR gates 23 and 24 being in the group 17. The add control line K is applied to the other input of each of NOR gates 20 and 23 and the subtract control line K' is applied to the other input of each of NOR gates 21 and 24. As well understood by those skilled in the art, NOR gates produce a 1-state output if all of its inputs are in a 0-state and produce a 0-output for all other inputs. NOR gates are described in the literature and particularly in Digital Computer and Control Engineering by R. S. Ledley, McGraw-Hill, 1960, at pages 578 and 668 et seq.

Thus, it will be understood that a NOR gate is disabled and produces a logic low if any one of its inputs is high.

Accordingly, with add control line K being high, then gates 20 and 23 are disabled and produce a 0-state output no matter what the state of its other input. With regard to gates 21 and 24 the 0-state K' input is effective to enable these gates. Thus, gate 21 produces a high output since its $A_1'$ input is low and gate 24 produces a low output since its $A_1$ input is high.

In NOR group 18, the outputs of NOR gates 20 and 21 are applied as two inputs **28*a* and 28*c* of a total of three inpust of NOR gate 28. The third input 28*b* to gate 28 is from operand $B_1$. As previously described the output of gate 21 is high, and thus input 28*c* is high thereby to disable NOR gate 28** to produce a low output.

NOR gates 23 and 24 of NOR group 17 have their outputs applied as two inputs **30*a* and 30*c* respectively to NOR gate 30. The third input 30*b* of gate 30 is from operand $B_1'$. As previously described the output of gates 23 and 24 are low, thereby to enable gate 30. With $B_1'$ low, then all three inputs to gate 30 are low and its output is high or in 1-state. This 1-state output is applied to OR gate 32 to produce a 1-state carry $C_1$ to the second full adder. The 1-state carry is correct for the assumed condition of $A_1$ and $B_1$ being high. Thus, it will be seen that the carry-borrow within the first order 10*a* itself is generated by gate groups 17 and 18**.

The outputs of gates 28 and 30 are applied as inputs to NOR gates 36 and 35 respectively. Since the output of gate 30 is high, that high input is effective to disable NOR gate 35 so that it produces a low output. The output of gate 35 is applied to an input of OR gate 37 the other input of which is connected to the output of NOR gate 28 which in the assumed condition is in a 0-state. Accordingly, with both inputs in a 0-state the output of OR gate 37 indicating complementary carry $C_1'$ is also in a 0-state which is correct for the assumed condition.

As previously described gate 36 provides the logic associated with the second term of Equation 8 and gate 35 provides the logic associated with second term of Equation 9. Accordingly, gate 36 has three inputs **38*a*–38*c* which are applied from the complenetary three wire carry-borrow $C_0'$ of the prior subset. Similarly, NOR gate 35 has three inputs at 39*a*–39*c* applied from the three wire carry-borrow of the prior subset. However, since subset 10** is the least significant subset of the eight bit full carry-borrow system, FIG. 1, then the signals corresponding to $C_0$ and $C_0'$ are obtained from other sources and $C_0$ is maintained in the 0-state while $C_0'$ is maintained in the 1-state.

The second order carries $C_2$ and $C_2'$ are produced in stage 10*b* of subset 10. NOR gates 43, 44 and 50 of group 25 of the second order are similar to gates 23, 24 and 30 of the first order with operand $A_2$ being applied to gate 44, $A_2'$ being applied to gate 43, K being applied to gate 43 and K' being applied to gate 44. Since K is high and K' is low, gate 43 is disabled while gate 44 is enabled. In the assumed case $A_2$ is high and therefore the output of gate 44 as well as the output of gate 43 are low which are applied as two of the three inputs to NOR gate 50. The third input to gate 50 is $B_2'$ which in the assumed case is high and therefore the output of gate 50 is low. In similar manner NOR gate 40, 41 and 48 of group 26 correspond to NOR gates 20, 21 and 28 of group 18. Accordingly, $A_2$ is applied to gate 40 and A' is applied to gate 41. Since K is high and K' is low, gate 40 is disabled and gate 41 is enabled. Since in the assumed case $A_2'$ is low the output of gate 41 is high thereby to disable gate 48. Since gate 48 is disabled the low inputs from gate 40 and from $B_2$ input do not effect that gate which produces a low output.

Thus, gate groups 25 and 26 produce the carry-borrow associated with the second order operands within the second order 10*b*. More particularly, as previously mentioned, gate groups 25 and 26 provide the logic associated with the first terms of Equations 10 and 11, respectively, viz., $B_2Y_2$, $B_2'Y_2'$. Accordingly, gate group 25 only produces an output in 1-state at terminal 10*d* when $A_2$–1 and $B_2$–1 indicating that a carry is produced within the second order no matter what the first order produces. As the complement, group 26 only produces a 1-state output at terminal 10*g* when $A_2$–1 and $B_2'$–1 ($A_2$–0, $B_2$–0). For all other inputs, gates 25 and 26 produce 0-state outputs.

In this manner, it will be recalled in the assumed condition K–1, $A_2$–1, and $B_2$–0 and therefore, a 0-state output is generated by gate groups 25 and 26 within the second order itself. However, a second order carry $C_2$ in a 1-state is to be produced since both $A_2$ and $C_1$ are in a 1-state. The generation of the second order carry will be understood from the following explanation of the remaining gates 37, 37*a*, 38 and 38*a* of the second order.

As previously described, gate 37 provides the logic associated with the second term of Equation 10 and gate 38 provides a logic associated with the complement thereof which is the second term of Equation 11. Accordingly, gate 37 has an input connected to the output of gate group 26 which corresponds to the expression $B_2'$, $Y_2'$. Another input of gate 37 is applied from $B_1'$, and the remaining inputs of gate 37 are connected to the outputs of NOR gates 23 and 24 which together correspond to Equation 7, ziv., Y'. By combining all four inputs to NOR gates 37, there is an output at terminal 10*e* corresponding to the second term of Equation 10. Both gates 23 and 24, as previously described produce 0-outputs since $K_1$–1 and $A_1$–1. In addition, the remaining two inputs to gate 37 are also in a 0-state since $B_1'$ is low and the output of group 26 is low. Thus, with all inputs to gate 37 being low, its output is in a 1-state which indicates that carry $C_2$ is high which is correct for the assumed condition.

Gate 38 which produces the complement of gate 37 has similar inputs. Specifically, two of the inputs of gate 38 are connected to the output of gates 20 and 21 which together produce an output corresponding to Equation 6. In addition, the third input to gate 38 is connected to $B_1$ and the remaining input of gate 38 is connected to the output of gate group 25 which corresponds to $B_2Y_2$. Thus, it will be understood that the combination of all four inputs to NOR gate 38 produce an output at terminal 10*f* corresponding to the logic associated with the second term of the Equation 11. With the outputs of gate 21 and $B_1$ both being in a 1-state, then gate 38 is disabled and produces a 0-state output which corresponds to the complement of the output of gate 37.

This, it will now be seen that in accordance with the invention, gates 37 and 38 provide a carry-borrow for the second order logical expression described above. More specifically, during addition, if the first order operands are both in a 1-state then a first order $C_1$ in a 1-state must be produced. Then if either $A_2$ or $B_2$ is in a 1-state, a carry $C_2$ in a 1-state must be produced. The foregoing can be written:

TABLE II $$\begin{matrix} A_1\text{-}1 \\ B_1\text{-}1 \\ C_1\text{-}1 \end{matrix} \qquad \begin{matrix} A_2 \\ B_2 \end{matrix}\begin{pmatrix} 1 & 0 \\ 0 & 1 \end{pmatrix} \qquad C_2\text{-}1$$

Gate 37 recognizes these states in the following manner. The output of group 26 ($B_2'Y_2'$) produces a disabling 1-state signal only when $A_2$–0 and $B_2$–0. Gates 23 and 24 produce an enabling 0-state signal during addition if $A_1$–1 and $B_1'$ input produces an enabling signal when $B_1$–1. With all enabling signals applied to gate 37, a 1-state or carry $C_2$ is produced.

In this manner, in the generation of a second order carry by gate 37 for the conditions outlined in Table II, it is not necessary for the second order 10*b* to wait until the first order 10*a* has produced a first order carry before the second order begins the generation of a carry.

It will be understood that the production of the complementary carry by gate 38 is merely the converse of the foregoing explanation.

Gates 37*a* and 38*a* as previously described provide the logic associated with the third term of Equations 10 and 11 respectively. During addition, gate 37*a* produces a 1-state second order carry $C_2$ when either $A_2$ or $B_2$ are in a 1-state and either $A_1$ or $B_1$ are in a 1-state and carry $C_0$ is in a 1-state. This condition may be set forth as:

TABLE III $$\begin{matrix} A_1 \\ B_1 \end{matrix}\begin{pmatrix} 0 & 1 \\ 1 & 0 \end{pmatrix} \quad \begin{matrix} A_2 \\ B_2 \end{matrix}\begin{pmatrix} 0 & 1 \\ 1 & 0 \end{pmatrix}$$

$$C_0\text{-}1 \qquad C_1\text{-}1 \qquad C_2\text{-}1$$

Specifically, there is applied to gate 37*a* the three wire complementary carry $C_0'$ applied by way of conductors 38*a*–38*c*. Thus, if the carry $C_0$ from the prior subset is in a 1-state, then the complementary carry $C_0'$ is in a 0-state, thereby to enable gate 37. The remaining two inputs to gate 37*a* are from the outputs of gate group 18 of the first order ($B_1'Y_1'$) and gate group 26 of the second order ($B_2'Y_2'$). The output of gate group 18 as previously described is in a 1-state or inhibiting state only when $A_1$–0 and $B_1$–0. Similarly, the output of gate group 26 is only in a disabling or inhibiting state when the $A_2$–0 and $B_2$–0. In this manner, for the condition of Table III*a* 1-state carry $C_2$ of the second order is produced when the first order operands would not by themselves produce a first order carry, but the carry $C_0$ would require the first order to produce a carry $C_1$. The second order operands would not by themselves require a second order carry but with the addition of a first order carry would produce a second order carry $C_2$.

In accordance with the invention, the foregoing Table III condition is determined prior to the time that the first order actually produces a carry C. In this manner, there is achieved a great reduction in the time of producing a carry $C_2$ since the second order does not have to wait until the carry $C_0$ has rippled through the first order.

It will be understood that NOR gate 38*a* produces the complement of gate 37*a*. Accordingly, three of the inputs of gate 38*a* are the three wire 39*a*–39*c* carry $C_0$ of the prior subset. The remaining two inputs are connected to the outputs of gate groups 17 and 25, which produce 1-state inhibiting signals only if the operands applied to those gate groups are in a 1-state.

This condition may be set forth as follows:

TABLE IV $$\begin{matrix} A_1' \\ B_1' \end{matrix}\begin{pmatrix}0 & 1\\1 & 0\end{pmatrix} \quad \begin{matrix} A_2' \\ B_2' \end{matrix}\begin{pmatrix}0 & 1\\1 & 0\end{pmatrix}$$

$C_0'$–1 $\quad$ $C_1'$–1 $\quad$ $C_2'$–1

In this manner, if gate 37*a* produces a 1-state output for the reasons above described, gate 38*a* produces a 0-state output.

In accordance with the invention the three wire carry-borrow output $C_2$–$b_2$ of subset 10 at terminals 10*a*–10*c* are applied to subset 11 as the "true" three-wire carry-borrow connector input. In similar manner, the complementary carry three wire output $C_2'$–$b_2'$ at terminals 10*f*–10*h* are applied to subset 11 as the complementary three wire carry-borrow connector input. Both the true and complementary three wire inputs to subset 11 are utilized in a manner similar to that described above for subset 10.

In summary, it will now be understood that subset 10 may be separated into a first order 10*a* and second order 10*b*. The true logic network for the first order 10*a* comprises first true gate means 17 and second true gate means 36. The true logic network for the second order 10*b* comprises first true gate means 25, second true gate means 37*a* and third true gate means 37. Similarly, the complementary logic network of the first order 10*a* comprises first complementary gate means 18 and second complementary gate means 35. The complementary logic network for the second order 10*b* comprises first complementary gate means 26, second complementary gate means 38*a* and third complementary gate means 38. The first true gate means 17 and 25 each produce the logic expression BY of their corresponding orders. Similarly, first complementary gate means 18 and 26 each produce the logic expression B'Y' of their corresponding orders.

The truth table for the first true gate means 17 and 25 during addition may be expressed generally as follows:

TABLE V

| | | | |
|---|---|---|---|
| A | 1 | 0 1 | 0 |
| B | 1 | 1 0 | 0 |
| | always a carry C=1 BY=1 (B'Y'=0) | conditional on carry BY=0 (B'Y'=0) | no carry output BY=0 (=1) |

Thus, for example, it will be understood that with both second order true operands in a 0-state, that the second order cannot produce a true carry output in a 1-state whatever the state of the first order carry. Accordingly, the B'Y' output of gate group 26 is in a 1-state thereby to inhibit gates 37*a* and 37. For the condition of Table II, either one but not both of the second order true operands are in a 1-state, and both first order true operands are in a 1-state. Thus, gate 26 produces a 0-state output ($B_2'Y_2'=0$) which enables gate 37. With $A_1$–1 and $B_1$–1, gate 37 produces a true carry output $C_2$–1. Similarly, for the condition of Table III, gate means 26 produces a 0-state output ($B_2'Y_2'=0$) and gate means 18 produces a 0-state output ($B_1'Y_1'=0$). With $C_0$–1 then gate 37*a* produces a true carry output $C_2$–1.

In view of the foregoing, subtraction may be understood by comparing the following Table VI with that of Table V for gate means, 17, 25:

TABLE VI

| | | | |
|---|---|---|---|
| A Minuend | 0 | 1 0 | 1 |
| B Subtrahend | 1 | 1 0 | 0 |
| | always a borrow b=1 BY=1 (B'Y'=0) | conditioned on borrow BY=0 B'Y'=0 | no borrow output BY=0 (B'Y' =1) |

During subtraction the K' subtract instruction signal is in a 1-state while the K add instruction signal is in a 0-state. Thus, the BY and the B'Y' outputs of the first gate means are as indicated in Table VI. The first true gate means 17 and 25 produce a true borrow in a 1-state when the minuend A is in a 0-state and the subtrahend is in a 1-state. Conversely, the first complementary gate means 18 and 26 produce a complementary borrow in a 1-state when the complementary minuend is in a 0-state and the complementary subtrahend is in a 1-state. It will be understood that a true borrow cannot be produced by the first true gate means 16 and 25 when the minuend is in a 1-state and the subtrahend is in a 0-state. For this condition, gate group 26 produces a B'Y' in a 1-state, thereby to disable gates 37*a* and 37.

One of the remaining conditions of subtraction is similar to Table II of addition, in which the first order operands themselves produce a borrow $b_1$–1 as follows:

TABLE VII $$\begin{matrix} A_1\text{–}0 \\ B_1\text{–}1 \end{matrix} \quad \begin{matrix} A_2 \\ B_2 \end{matrix}\begin{pmatrix}1 & 0\\1 & 0\end{pmatrix}$$

$b_1$–1 $\quad$ $b_2$–1

In this condition gates 26 produces a 0-state output $B_2'Y_2'$–0 which enables gate 37. With $A_1$–0 and $B_1$–1, gate 37 produces true borrow output $b_2$–1

Similarly, the last of the true borrow subtraction conditions is similar to Table III in which the first order operands only produce a borrow $b_1$–1 when $b_0$–1 as follows:

TABLE VIII $$\begin{matrix} A_1 \\ B_1 \end{matrix}\begin{pmatrix}1 & 0\\1 & 0\end{pmatrix} \quad \begin{matrix} A_2 \\ B_2 \end{matrix}\begin{pmatrix}1 & 0\\1 & 0\end{pmatrix}$$

$b_0$–1 $\quad$ $b_1$–1 $\quad$ $b_2$–1

In this condition gate group 26 produces a 0-state output ($B_2'Y_2'=0$) and gate group 28 produces a 0-state output ($B_1'Y_1'=0$). With $B_0$–1, then gate 37*a* produces a true borrow output $B_2$–1.

It will be understood that the foregoing explanation applies equally to the operation of gates 38 and 38*a* to produce complementary borrow output $b_0'$–1.

There has now been described a two order subset 10 and it will be understood that in accordance with the invention, a subset may comprise more than two orders. For example, a three order subset is illustrated in FIG. 3 which comprises all of the first and second order 10*a* and 10*b* elements of FIG. 2. The elements of FIG. 3 which are identical with those of FIG. 2 have been identified by corresponding reference characters.

It will be clear to those skilled in the art that Equation 10 relating to the true carry-borrow for the second order $C_2$–$b_2$ may be expanded to provide for the third order as follows:

$$(12) \quad C_3\text{–}b_3 = B_3Y_3 + B_2Y_2(B_3+Y_3) + B_1Y_1(B_2+Y_2)(B_3+Y_3) + C_0(B_1+Y_1)(B_2+Y_2)(B_3+Y_3)$$

The equivalent terms of Equations 10 and 12 may be compared and it will be seen that the first and second terms of Equation 10 are similar to the first and second terms respectively of Equation 12. In addition, the third term of Equation 10 is similar to the fourth term of Equation 12. With regard to the first terms of Equation 10 and 12, these logic functions are provided by gate groups 25 and 25*a* respectively. With regard to the second terms of Equations 10 and 12, these functions are provided by NOR gates 37 and 37' respectively. More particularly, gate 37' has an input connected to the first complementary gate 26*a* of the corresponding third order. In addition, the remaining inputs of gate 37' are connected to the outputs of gates 43 and 44 and to the complementary operand B of the second order. In this matter, gate 37' (third true gate) provides a true carry-borrow signal output when a complementary carry-borrow signal is not applied and both true operands $A_2$ and $B_2$ of the second order are in a 1-state. On the other hand, gate 37' during subtraction produces a true carry-borrow signal output when a complementary carry-borrow signal is not applied and $A_2$ is in a 0-state and $B_2$ is in a 1-state.

The fourth term of Equation 12 is provided by NOR gate **37*a*' and it will be understood that for a three order subset, that a four wire carry-borrow connector $C_0'$ is required form the preceding subset. Such four wire input is applied to NOR gate 37*a*' together with the output of the first complementary gate 26*a* of its corresponding third order as well as the output of the first complementary gate 26 of the second order and the first complementary gate 18 of the first order. In this manner, the first complementary gate of each of the orders in the subset is connected to the second true gate 37*a*'. When none of the inputs to gate 37*a*'** is in a 1-state, then that gate produces a true carry-borrow signal output $C_3–b_3$ for the third order.

The remaining NOR gate 80 of the true logic network for the third order **10*c* provides the logic associated with the third term of Equation 12. Specifically, gate 80 (fourth true gate) is connected to the output of the first complementary gate 26*a* of the corresponding third order as well as to the output of the first complementary gate 26 of the second order. In this manner, gate 80 is connected to all orders except for the first order. The remaining inputs of gate 80 are connected to the outputs of NOR gates 23 and 24** and to the complementary operand B of the first order. In this way, during addition, a true carry-borrow signal output is produced when a complementary carry-borrow signal is not applied from the second and third order and both true operands A and B of the first order are in a 1-state. This is in accordance with the third term of Equation 12 and provides for the carry state described below.

TABLE IX $$\begin{matrix} A_1\text{–}1 & A_2\begin{pmatrix}1 & 0\\ 0 & 1\end{pmatrix} & A_3\begin{pmatrix}1 & 0\\ 0 & 1\end{pmatrix} \\ B_1\text{–}1 & B_2 \quad\quad & B_3 \quad\quad \\ C_2\text{–}1 & & C_3\text{–}1 \end{matrix}$$

The foregoing operation of gate 80 may also be described for subtraction as follows. A true borrow signal in a 1-state is produced by gate 80 when a complementary carry-borrow signal is not applied to that gate and in the first order, the true minuend operand $A_1$ is in a 0-state and the true subtrahend operand of $B_1$ is in a 1-state.

There has now been described all of the four true carry-borrow outputs of the third order **10*c* which corresponds to the four terms of Equation 12. It wil be understood that in the manner previously described that the complementary carry-borrow outputs of the third order 10*c* are produced in similar manner. Thus, gate group 26*a* provides the first term of the complementary carry-borrow equation corresponding to Equation 12, NOR gate 38' provides the second term, gate 80*a* provides the third term and gate 38*a*'** provides the fourth term. These gates provide the complementary logic equivalent of the third order true carry-borrow above described.

It will be understood by those skilled in the art that the above described detailed embodiments are meant to be merely exemplary and that they are susceptible of modification and variation without departing from the spirit and scope of the invention. For example, the carry-borrow subsets may comprise four or more orders.

What is claimed is:

1. A serial-parallel binary carry-borrow system comprising a plurality of subset carry-borrow circuits connected in series circuit relation with each subset providing at least two orders of carry-borrow, a true logic network and a complementary logic network for each order of each subset, means for applying true and complementary operands of each order in parallel to said true and complementary logic networks, respectively, of the corresponding order, first true gate means for each true logic network responsive to add-subtract instruction signals for producing (1) during addition a true carry-borrow signal output when both true operands are in a 1-state, and (2) during subtraction, a true carry-borrow signal output when the true minuend operand is in a 0-state and the true subtrahend operand is in a 1-state, first complementary gate means for each complementary logic network responsive to add-subtract instruction signals for producing (1) during addition a complementary carry-borrow signal output when both complementary operands are in a 1-state, and (2) during subtraction a complementary carry-borrow signal output when the applied complementary minuend operand is in a 0-state and the complementary subtrahend operand is in a 1-state, second true gate means for each true logic network having inputs connected to (1) said first complementary gate means of the corresponding order and, of all preceding complementary orders in the subset, and (2) all the complementary carry-borrow signal outputs of the complementary logic network in the most significant order of the preceding subset in the series, to produce a true carry-borrow signal output for the corresponding order when none of said inputs have a complementary carry-borrow signal applied thereto, second complementary gate means for each complementary logic network having inputs connected to (1) said first true gate means of the corresponding order, and of all preceding true orders in the subset, and (2) all the true carry-borrow signal outputs of the true logic network in the most significant order of the preceding subset in the series, to produce a complementary carry-borrow signal output for the corresponding order when none of its inputs have a true carry-borrow signal applied thereto, third true gate means for each true logic network, except for the first order, being connected to said first complementary gate means of the corresponding order and responsive to the operands of the preceding order for producing (1) during addition, a true carry-borrow signal output when a complementary carry signal is not applied and both true operands of the preceding order are each in a 1-state, and (2) during subtraction, a true carry-borrow output when a complementary carry-borrow signal is not applied and in the preceding order the true minuend operand is in a 0-state and the true subtrahend operand is in a 1-state, and third complementary gate means for each complementary logic network except for the first order, being connected to said first true gate means of the corresponding order and responsive to the complementary operands of the preceding order for producing (1) during addition a complementary carry-borrow output when a true carry-borrow signal is not applied and both complementary operands of the preceding order are in a 1-state, and (2) during subtraction a complementary carry-borrow signal output when a true borrow signal is not applied and in the preceding order the complementary minuend operand is in a 0-state and the complementary subtrahend operand is in a 1-state.

2. The binary carry-borrow system of claim 1 in which there is provided fourth true gate means for each true logic network, except for the first and second orders of the subset, being connected to said first complementary gate means of the corresponding order, and except for the first order, of all preceding complementary orders in the subset for producing (1) during addition, a true carry-borrow signal output when a complementary carry-borrow signal is not applied and both true operands of the first order are in a 1-state, and (2) during subtraction, a true carry-borrow signal output when a complementary carry-borrow signal is not applied and in the first order the true minuend operand is in a 0-state and the true subtrahend operand is in a 1-state.

3. The binary carry-borrow system of claim 2 in which there is provided first OR gate means for each true logic network connected to the output of the corresponding (1) first true gate means, (2) second true gate means, (3) third true gate means, and (4) fourth true gate means to provided a carry-borrow output for the corresponding order.

4. The binary carry-borrow system of claim 1 in which there is provided fourth complementary gate means for each complementary logic network, except for the first and second orders of the subset, being connected to said first true gate means of the corresponding order, and, except for the first order, of all preceding true orders in the subset for producing (1) during addition, a complementary carry-borrow signal output when a true carry-borrow signal is not applied and both complementary operands of the first order are in a 1-state and (2) during subtraction, a complementary carry-borrow signal output when a true carry-borrow signal is not applied and in the first order the complementary minuend operand is in a 0-state and the complementary subtrahend operand is in a 1-state.

5. The binary carry-borrow system of claim 4 in which there is provided second OR gate means for each complementary logic network connected to the output of the corresponding (1) said first complementary gate means, (2) said second complementary gate means, (3) said third complementary gate means, and (4) said fourth complementary gate means to provide a carry-borrow output for the corresponding order.

6. The binary carry-borrow system of claim 1 in which each of said first true gate means and said first complementary gate means comprises a first, a second and a third NOR gate with the outputs of the first and second NOR gates being connected as inputs to said NOR gate and each of said first true gate means comprises said first NOR gate having applied thereto an add instruction signal and a first of the complementary operands of the corresponding order, said second NOR gate having applied thereto said subtract instruction signal and a first of the true operands of the corresponding order, and said third NOR gate having applied thereto a second of the complementary operands of the corresponding order.

7. The binary carry-borrow system of claim 6 in which said third true gate means comprises a fourth NOR gate having its inputs connected to (1) said first complementary gate means of the corresponding order, (2) the outputs of the first and second NOR gates of the first true gate means of the preceding order, and (3) said second complementary operand.

8. The binary carry-borrow system of claim 6 in which said third complementary gate means comprises a fifth NOR gate having its inputs connected to (1) said first true gate means of the corresponding order, (2) the outputs of said first and second NOR gates of said first complementary gate means of the preceding order, and (3) said second operand of the preceding order.

9. A binary carry-borrow system in a parallel digital computer comprising a plurality of series connected subset carry-borrow circuits each providing at least two orders, a true logic network and a complementary logic network for each order of each subset, means for applying true and complementary operands of each order in parallel to said true and complementary logic networks of the corresponding order, true and complementary carry-borrow connector means connected to the respective true and complementary logic networks of the most significant order of each subset, first true gate means for each true logic network responsive to add-subtract instruction signals for producing (1) during addition, a true carry-borrow signal output when both true operands are in a 1-state, and (2) during subtraction, a true carry-borrow signal output when the true minuend operand is in a 0-state and the true subtrahend operand is in a 1-state, first complementary gate means for each complementary logic network responsive to add-subtract instruction signals for producing (1) during addition, a complementary carry-borrow output when both complementary operands are in a 1-state, and (2) during subtraction, a complementary carry-borrow signal output when the applied complementary minuend operand is in a 0-state and the complementary subtrahend operand is in a 1-state, second true gate means for each true logic network having inputs connected to (1) the output of said first complementary gate means of the corresponding order, and of all preceding complementary orders in the subset, and (2) said complementary carry-borrow connector means of the preceding subset in the series, to produce a true carry-borrow signal output for the corresponding order when none of said inputs have a complementary carry-borrow signal applied thereto, second complementary gate means for each complementary logic network having inputs connected to (1) the output of said first true gate means of the corresponding order, and, of all preceding true orders in the subset, and (2) said true carry-borrow connector means of the preceding subset in the series, to produce a complementary carry-borrow signal output for the corresponding order when none of its inputs have a true carry-borrow signal applied thereto, third true gate means for each true logic network, except for the first order, being connected to the output of said first complementary gate means of the corresponding order and responsive to the operands of the preceding order for producing (1) during addition, a true carry-borrow signal output when a complementary carry-borrow signal is not applied and both true operands of the preceding order are in a 1-state, and (2) during subtraction a true carry-borrow signal output when a complementary carry-borrow signal is not applied and in the preceding order the true minuend operand is in a 0-state and the subtrahend operand is in a 1-state, and third complementary gate means for each complementary logic network, except for the first order, being connected to the output of said first true gate means of the corresponding order and responsive to the complementary operands of the preceding order for producing (1) during addition, a complementary carry-borrow signal output when a true carry-borrow signal is not applied and both complementary operands of the preceding order are in a 1-state, and (2) during subtraction, a complementary carry-borrow signal output when a true carry-borrow signal is not applied and in the preceding order the complementary minuend operand is in a 0-state and the complementary subtrahend operand is in a 1-state.

10. The binary carry-borrow system of claim 9 in which said true carry-borrow connector means of each subset comprises a connection to the output of (1) said first true gate means, (2) said second true gate means, and (3) said third true gate means, of the true logic network of the most significant order in the subset.

11. The binary carry-borrow system of claim 10 in which said complementary carry-borrow connector means of each subset comprises a connection to the output of (1) said first complementary gate means, (2) said second complementary gate means and (3) said third complementary gate means, of the complementary logic network of the most significant order in the subset.

12. The binary carry-borrow system of claim 11 in which each of said first true gate means and said first complementary gate means comprises a first, a second and a third NOR gate with the outputs of the first and second NOR gates being connected as input to said third NOR gate, and each of said first true gate means comprises said first NOR gate having applied thereto an add instruction signal and a first of the complementary operands of the corresponding order, said second NOR gate having applied thereto said subtract instruction signal and a first of the true operands of the corresponding order, and said third NOR gate having applied thereto a second of the complementary operands of the corresponding order.

13. The binary carry-borrow system of claim 12 in which each of said first complementary gate means comprises said first NOR gate having applied thereto said add instruction signal and said first true operand of the corresponding order, said second NOR gate having applied thereto said subtract instruction signal and said first complementary operand of the corresponding order, and said third NOR gate having applied thereto a second of the true operands of the corresponding order.

14. The binary carry-borrow system of claim 13 in which said third true gate means comprises a fourth NOR gate having its inputs connected to (1) said firs complmentary gate means of the corresponding order, (2) the outputs of the first and second NOR gates of the first true gate means of the preceding order, and (3) said second complementary operand.

15. The binary carry-borrow system of claim 14 in which said third complementary gate means comprises a fifth NOR gate having its inputs connected to (1) said first true gate means of the corresponding order, (2) the outputs of said first and second NOR gates of said first complementary gate means of the preceding order, and (3) said second operand of the preceding order.

16. The binary carry-borrow system of claim 15 in which there is provided a sixth NOR gate for each of said second true gates means and a seventh NOR gate for each of said second complementary gate means.

17. The binary carry-borrow system of claim 11 in which there is provided OR gate means for each true logic network and for each complementary logic network, means connecting the outputs of all the gate means of each logic network to its corresponding OR gate means of a true logic network produces a true carry-borrow and the OR gate means of a complementary logic network produces a complementary carry-borrow.

18. A binary carry system comprising a plurality of series connected subset carry circuits each providing at least two carry orders, a true logic network and a complementary logic network for each carry order of each subset, means for applying true and complementary operands of each order in parallel to said true and complementary logic networks of the corresponding carry order, true and complementary carry connector means connected to the respective true and complementary logic networks of the most significant order of each subset, first true gate means for each true logic network for producing a true carry signal output for the corresponding order when the applied operands are each in a 1-state, first complementary gate means for each complementary carry signal for the corresponding order when the applied complementary operands are each in a 1-state, second true gate means for each true logic network having its inputs connected to: (1) said first complementary gate means of the corresponding order and, of all preceding complementary orders in the subset, and (2) said complementary carry connector means of the preceding subset in the series, to produce a true carry signal output for the corresponding order when none of said inputs have a complementary carry signal applied thereto, second complementary gate means for each complementary logic network having its inputs connected to: (1) said first true gate means of the corresponding order, and, of all preceding true orders in the subset, and (2) said true carry connector means of the preceding subset in the series, to produce a complementary carry signal output for the corresponding order when none of its inputs have a true carry signal applied thereto, third true gate means for each true logic network, except for the first order, having its inputs connected to: (1) said first complementary gate means of the corresponding order, and (2) means producing a disabling signal when either of the complementary operands of the preceding order are in a 1-state, to produce a true carry signal output of the corresponding order when neither a complementary carry signal nor a disabling signal is applied to said inputs, third complementary gate means for each complementary logic network, except for the first order, having its inputs connected to: (1) said first true gate means of the corresponding order, and (2) means producing a disabling signal when either of the true operands of the preceding order are in a 1-state, to produce a complementary carry signal output for the corresponding order when neither a true carry signal nor a disabling signal is applied to said inputs, said true carry connector means of each subset comprising a connection to the output of (1) said first true gate means, (2) said second true gate means, and (3) said third true gate means, of the true logic network of the most significant order in the corresponding subset, and said complementary carry connector means of each subset comprising a connection to the output of (1) said first complementary gate means, (2) said second complementary gate means, and (3) said third complementary gate means of the complementary logic network of the most significant order in the corresponding subset.

19. The carry system of claim 18 in which there is provided OR gate means for said true logic network and for said complementary logic network of each order of each subset, means connecting all of the gate means of each logic network to its corresponding OR gate means whereby the OR gate means of a true logic network produces a true carry of the corresponding order and the OR gate means of a complementary logic network produces a complementary carry of the corresponding order.

20. The carry system of claim 18 in which there is provided fourth true gate means for each true logic network, except for the first and second orders, having its inputs connected to: (1) said first complementary gate means of the corresponding order and, except for the first order, of all preceding complementary order in the subset, and (2) means producing a disabling signal when either complementary operands of the first order of the subset is in a 1-state, to produce a true carry signal output for the corresponding order when neither a complementary carry signal nor a disabling signal is applied to said inputs.

21. The carry system of claim 18 in which there is provided fourth complementary gate means for each complementary logic network, except for the first and second orders, having its inputs connected to: (1) said first true gate means of the corresponding order and except for the first order, of all preceding true orders in the subset, and (2) means producing a disabling signal when either complementary operands of the first order of the subset is in a 1-state, to produce a complementary carry signal output for the corresponding order when neither a complementary carry signal nor a disabling signal is applied to said inputs.

References Cited

UNITED STATES PATENTS 3,198,939 8/1965 Helbig et al. -------- 235—176

OTHER REFERENCES

Bruce Gilchrist, J. H. Pomerene, and S. Y. Wong, Fast Carry Logic for Digital Computers, IRE Trans., December 1955, pp. 133–136.

MALCOLM A. MORRISON, *Primary Examiner.*

D. H. MALZAHN, *Assistant Examiner.*

U.S. Cl. X.R.

235—168, 176